E. H. BUDROW.
CONNECTING DEVICE.
APPLICATION FILED DEC. 28, 1918.
1,390,980.
Patented Sept. 20, 1921.
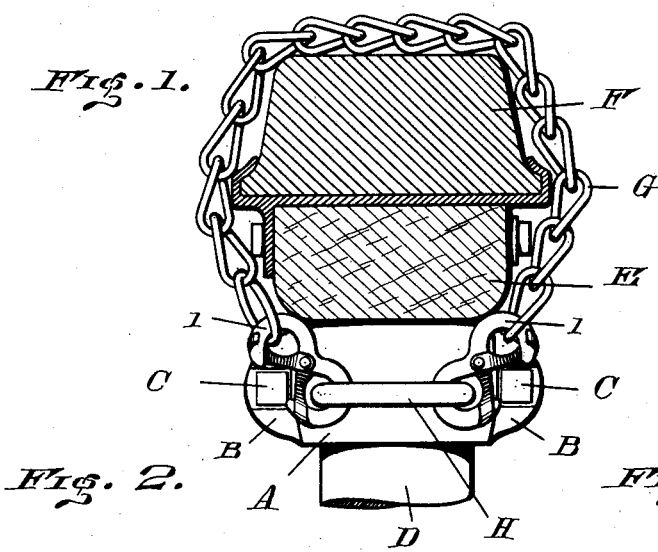
Fig. 1.
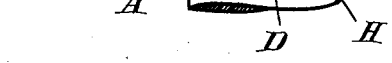
Fig. 2.   Fig. 3.
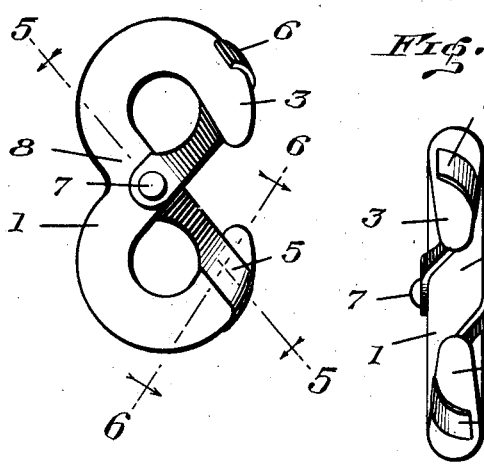
Fig. 4.
Fig. 5.   Fig. 6.
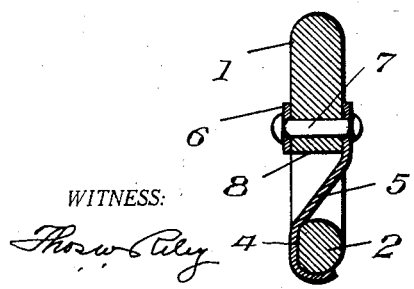
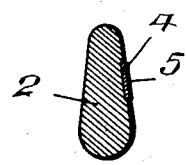
WITNESS:
Thos W Riley
INVENTOR.
Edward H. Budrow
BY W. H. Babcock & Son
ATTORNEY.

UNITED STATES PATENT OFFICE.

EDWARD H. BUDROW, OF MERIDEN, CONNECTICUT, ASSIGNOR TO THE STEEL PRODUCTS COMPANY, OF HARTFORD, CONNECTICUT, A CORPORATION OF CONNECTICUT.

CONNECTING DEVICE.

1,390,980.  Specification of Letters Patent.  Patented Sept. 20, 1921.

Application filed December 28, 1918. Serial No. 268,717.

*To all whom it may concern:*

Be it known that I, EDWARD H. BUDROW, a citizen of the United States, residing at Meriden, in the county of New Haven and State of Connecticut, have invented certain new and useful Improvements in Connecting Devices, of which the following is a specification.

This invention relates to connector devices primarily intended by applicant for use as part of an anti-skidding or traction unit, of the fixed point type, applied to an automobile truck wheel, and is shown and described in detail as a part separate from the clamp, but this is not essential.

It has for its chief objects to provide a connecting means which will be reliable in operation or actual use, to so mount the keepers or guards thereof as to eliminate damage thereto by the eye of the clamp and the edge of the felly of the wheel; to reduce the amount of material required for guards of this nature, while adding to their strength in the direction of strain; to so mount the guards that they can be opened only by movement in two directions; and to mount them in such relation to each other that they can be opened in succession only; all of which objects are accomplished by the construction, combination and arrangement of parts, all as hereinafter more particularly set forth, described and claimed.

In the accompanying drawings:

Figure 1 represents a section transversely through a portion of a wheel, with a traction unit, in which devices embodying my invention are employed, in elevation applied thereto;

Fig. 2, a side elevation of a device embodying my invention;

Fig. 3, a similar view, one of the keepers being moved to intermediate position;

Fig. 4, an edge elevation of one of said devices;

Fig. 5, a sectional view on the line 5—5 of Fig. 2;

Fig. 6 represents a similar view on the line 6—6 of Fig. 2.

Referring now in detail to the drawings, A indicates the front plate of a two plate clamp provided with perforated end flanges B for the reception of the bolts C on which nuts are to be turned to draw the two plates together on the outer portion of a spoke D of the wheel adjacent the inner face of the felly E, on which is mounted the tire F. G indicates one of the transverse traction or anti-skidding chains of the fixed point or anchored type having its terminal parts or portions connected to the respective ends of the eye H of said plate A by means of the respective connecting devices 1.

The connectors 1 are preferably of E-shape, when of the type for use as shown in the drawing, and each connector has its opposed end portions of the bills of its hoops 2 and 3 recessed laterally on opposite sides of the respective end portions as at 4, so that each end portion of each hook has a recessed lateral face and a smooth lateral face, the recessed face of one being on the same side of the device as the smooth face of the other. Each recess 4 is formed with sharp side walls and extends entirely across its respective end portion or bill.

Resilient leaf-spring guards 5 and 6 pivotally mounted on the rivet 7 passing through the central inwardly presented portion 8 in normal position engage in, and by their resiliency in opposite lateral directions, are held in the recesses 4 of the respective end portions or bill of hooks 2 and 3, the keeper 5 being mounted on one side of the part 8, extending laterally between the hooks 2 and 3 and engaging in the slot or recess 4 of the hook 2 on the other side of the device; and the keeper 6 being similarly mounted on the other side of the device from the keeper 5, extending laterally between the hooks 2 and 3 and engaging in the recess 4 of hook 3.

As thus arranged it is apparent that, in view of the proximity of the portions or hooks 2 and 3, the keeper 5 cannot be moved to open position permitting the application or removal of a chain link to hook 2 so long as keeper 6 is out of normal position and vice versa.

The free ends of the keepers 5 and 6 are curved to conform to the cross-sectional form of the respective end portions or bills of hooks 2 and 3 and the edges of said keepers are preferably formed at right angles to the lateral engaging faces thereof, so as to engage reliably the side walls of the recesses 4, preventing pivotal movement of said keepers in the absence of prior lateral flexing.

As thus arranged there are no flexible parts in position to be brought into contact with, and deformed or otherwise injured by, the edge of the felly or the corner of the clamp plate, as there is no part bridging the interval between the two ends of the device.

The invention is, however, capable of being embodied in a number of different forms, and it is not necessary, nor does applicant wish to be understood as limiting himself, to making the device solely in the link form illustrated, nor does he wish to limit himself to making the device as a separate element distinct from the plate.

Having thus described my invention, what I claim as new and desire to secure by Letters Patent is:

1. A connecting device having two opposed hooks and having recesses in the opposite sides of the respective bills of the hooks, and on opposite sides of a line passing through the center of both of said hooks in combination with resilient keepers mounted for movement on opposite sides of a relatively fixed intermediate object, normally held by their resiliency in the respective recesses and engaging with their edges the walls thereof to guard the respective hooks against the application thereto, or removal therefrom, of additional elements so long as said keepers are in normal position.

2. A connecting device having two opposed hooks and having recesses in the opposite lateral faces of the respective bills of the hooks, in combination with resilient keepers mounted pivotally on opposite sides of a relatively fixed intermediate object and normally held by their resiliency, acting in planes at angles to their planes of pivotal movement, in the respective recesses.

3. A connecting device having two hooks and having recesses in the opposite lateral faces of the respective bills of the hooks, in combination with resilient keepers mounted pivotally on said device between said hooks and normally held by their resiliency in the respective recesses, the tips of the bills of said hooks being so spaced from each other with relation to the dimensions of said keepers, their form and their location that but one keeper at a time may be moved to full open position between the tips of said bills.

4. A connecting device having two opposed hooks and having recesses in the opposite sides of the respective bills of the hooks and on opposite sides of a line passing through the center of both of said hooks, in combination with resilient keepers mounted for pivotal movement on opposite sides of a relatively fixed intermediate object, normally held by their resiliency in the respective recesses and engaging with their edges the walls thereof to guard the respective hooks against the application thereto, or removal therefrom, of additional elements so long as said keepers are in normal position, said keepers having their free end portions formed to extend around and resiliently embrace a portion of the bills of the respective hooks.

In testimony whereof, I have signed my name to this specification in the presence of two subscribing witnesses.

EDWARD H. BUDROW.

Witnesses:
LOUIS W. CHISM,
WARREN D. CHASE.